Jan. 28, 1947.                    E. W. FLOSDORF ET AL                    2,414,940
          PROCESS AND APPARATUS FOR THE DRYING OF LIQUID-CONTAINING
              BIOLOGICAL MATERIALS BY FREEZING AND SUBLIMATING UNDER
              LOW PRESSURE IN THE PRESENCE OF A CHEMICAL DESICCANT
                         Filed Feb. 8, 1940              3 Sheets-Sheet 1
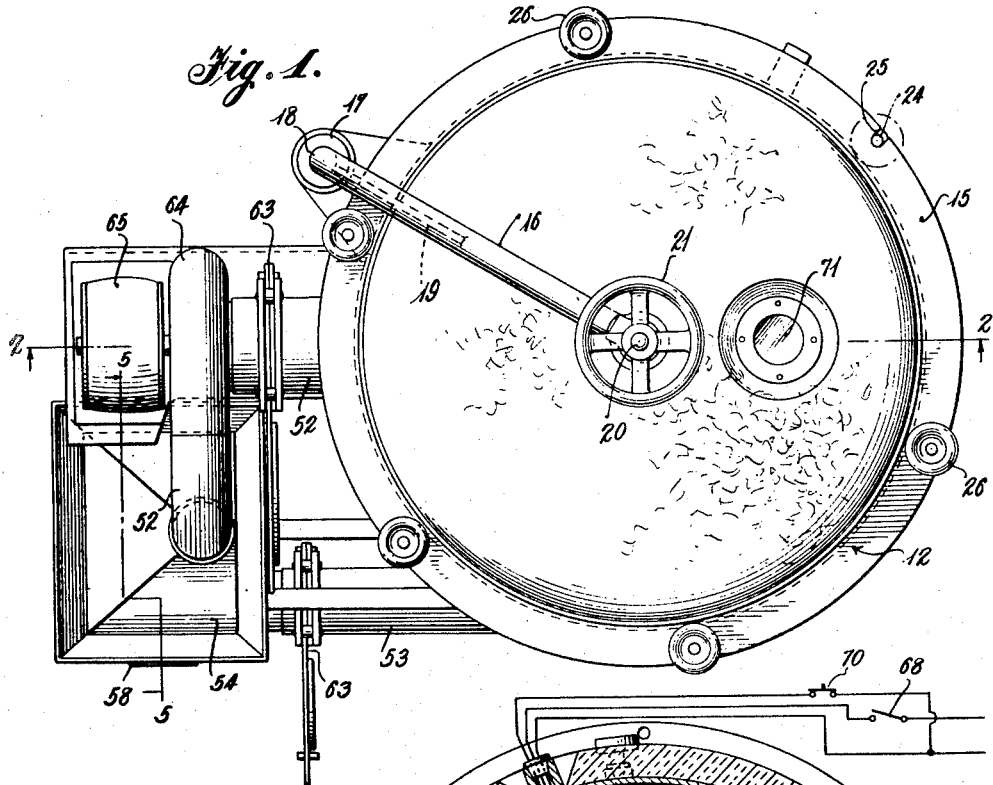
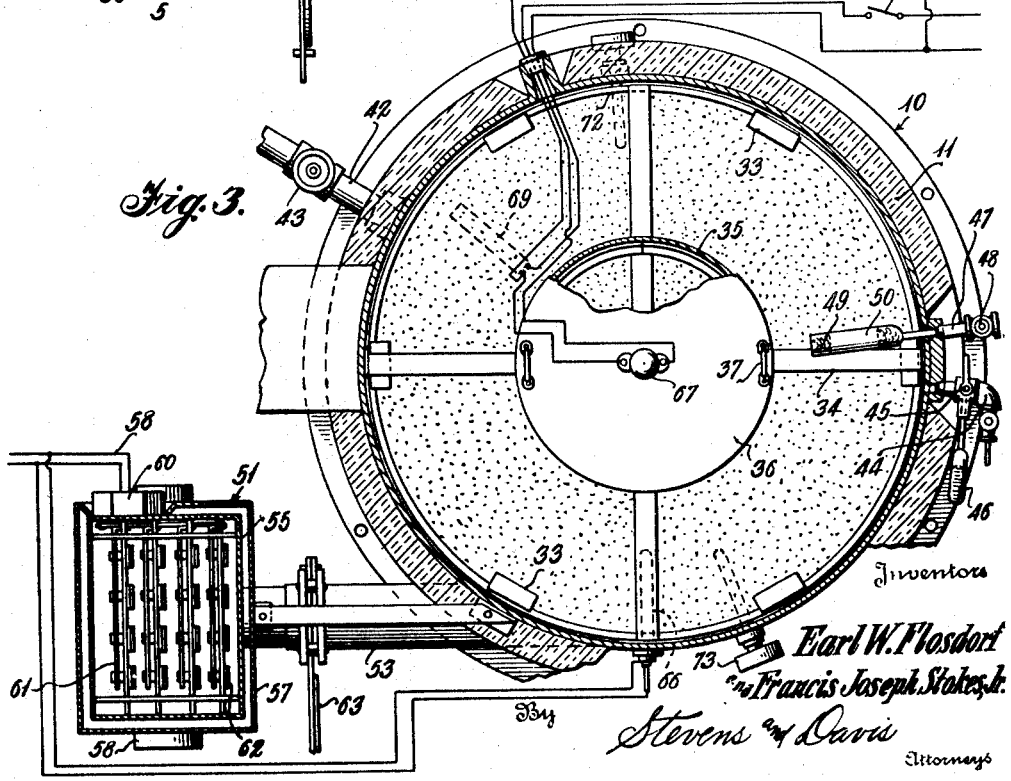
Inventors
Earl W. Flosdorf
Francis Joseph Stokes, Jr.
By Stevens and Davis
Attorneys

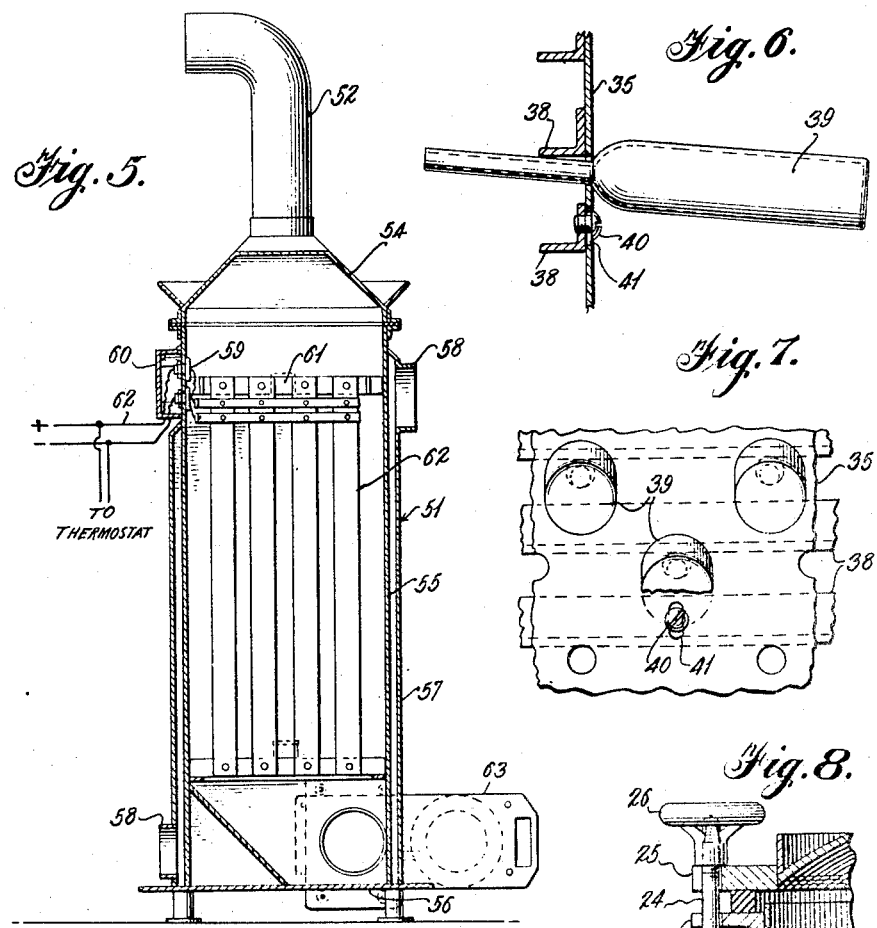
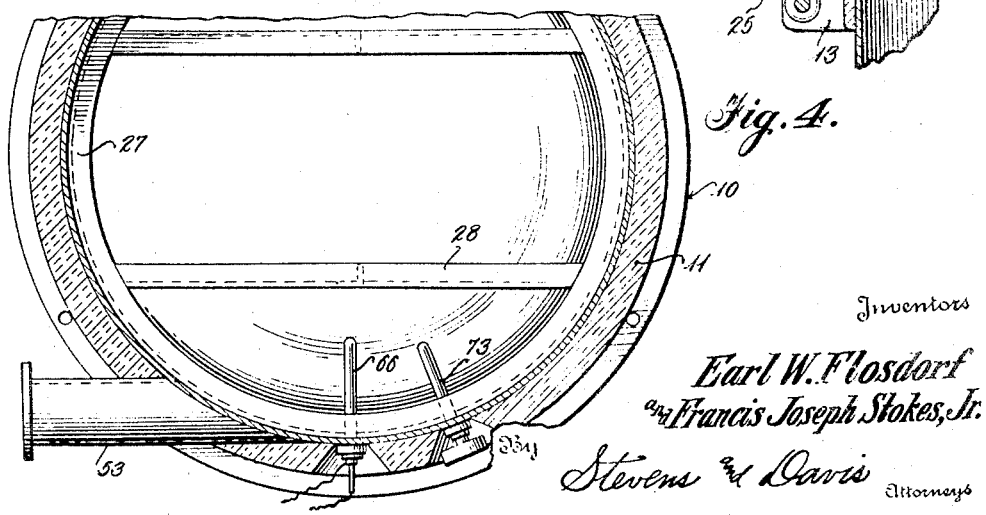

Patented Jan. 28, 1947

2,414,940

UNITED STATES PATENT OFFICE 2,414,940

PROCESS AND APPARATUS FOR THE DRYING OF LIQUID-CONTAINING BIOLOGICAL MATERIALS BY FREEZING AND SUBLIMATING UNDER LOW PRESSURE IN THE PRESENCE OF A CHEMICAL DESICCANT

Earl W. Flosdorf, Landsdowne, and Francis Joseph Stokes, Jr., Laverock, Pa., assignors, by mesne assignments, to Tabor-Olney Corporation, a corporation of Maryland Application February 8, 1940, Serial No. 317,958

7 Claims. (Cl. 34—5)

This invention relates to methods of and apparatus for improving the keeping qualities of liquid-containing biological substances including fruit juices, vegetable products, protein solutions, normal and immune blood serum, bacterial cultures, viruses and other labile biological and organic substances, and more particularly to methods and apparatus for the treatment and preservation of such substances by dehydration while in a frozen condition.

In the treatment of water-containing biological substances, it has long been known that preservation may be accomplished advantageously by the removal of water from the material and thereafter placing it in a sealed container for storage. In a dehydrated condition, the material does not deteriorate even when subjected to extended periods of storage, and when it is to be used, only the addition of water thereto, in an amount corresponding to the normal water content, is necessary to restore the preserved material to its original condition; or by the use of a lesser amount of water a more concentrated product can be obtained.

It has long been known to heat materials to effect the evaporation of the water therefrom. This procedure, however, is usually accompanied by deleterious effects when applied to the treatment of biological materials since the evaporation of the water produces a concentrating effect causing breakage of the tissues and cells and allows chemical alteration of the complex constituents, thereby so completely changing the structure as to permanently alter the very qualities which are sought to be preserved.

It has more recently been established that if, prior to the removal of the water from the material, the solid constituents can be "locked" in position, thereafter the removal of the water can be effected without injury to the biological material. To this end it has been proposed to freeze the biologically active substances and thereafter to effect the removal of ice by sublimation. It has also been found that the water vapor removed from the material by sublimation need not be condensed in the manner of a complete sublimation cycle, but that such water can be absorbed by a suitable chemical desiccant if properly applied.

In the freezing of the materials it has been found that either a rapid freezing by indirect heat exchange or a vacuum freezing can be employed with good results insofar as avoiding injury to the product is concerned.

Irrespective of the freezing process used or the manner of collecting the sublimed water vapor, it has been established that the broad concept of freezing and removing the ice, in the form of a vapor, produces results far superior to those attainable from heat treatments since no concentration of solute occurs during the process itself and furthermore the freezing temperatures employed avoid chemical interactions. Thus the desirable qualities of biological materials are retained unimpaired over long periods of storage so that the product with pure water added thereto may be used interchangeably with the original product.

Although the practice of the processes of the prior art involving the freezing of the liquid-containing biological materials and the sublimation of the ice therefrom are satisfactory in that the dehydration treatment is not injurious to the material treated, the prior processes are not as satisfactory as they otherwise might be because the water content of the material after treatment is very seldom uniformly below ½ or 1 percent by weight. The keeping qualities of the product are directly proportional to the extent of dehydration so that a water content of ½ or 1 percent is undesirable when the product is to be stored for extended periods of time.

It has been customary to expose the surface of the containers in which the material is treated directly to the outside atmosphere so that a source of heat for the sublimation may be available when the material is subjected to high vacuum. This expedient, however, presents a difficulty when the material to be treated is frozen by a process involving a degassing and a high vacuum step. This is because the presence of heat from the surrounding atmospheres so readily available by conduction through the walls of the containers to the material therein adjacent such walls, produces considerable evaporation of the material before freezing, which evaporation is made evident in the final product by a particularly heavy skin over the surface of the dry material. Also unless an elaborate system of controls is provided for regulating the temperature of the atmosphere in a changing fashion, the liability of melting or softening of the materials being dried, irrespective of the manner of freezing, is very great and constitutes a serious hazard to successful drying of valuable products.

According to this invention it is possible to dehydrate biologically active materials to a water content of less than .050 percent in a relatively short period of time while producing a product characterized by the absence of the heretofore known heavy skin over the surface of the dry material. This object is obtainable primarily because, according to the teachings of the present invention, the latent heat of sublimation is supplied, not at random by conduction through the walls of the container, but in a completely controlled manner which control is automatically responsive to the rate of sublimation. To this end this invention contemplates a process wherein the liquid-containing biological substance is frozen and the ice so produced is sublimed while the vapors evolved are concomitantly absorbed in the chemical desiccant, which absorptive reaction results in the evolution of heat. The heat of the absorption is used as the source of heat for the sublimation and by constantly transferring such heat from the desiccant to the treated material, the former is kept cool and consequently its aqueous tension properly low so as to keep it at maximum efficiency.

It is a further object of the present invention to provide an apparatus wherein the foregoing process may be advantageously accomplished and wherein the desiccant and biological material may be placed in heat exchange relationship while at the same time the flow of vapors between the biological material and the desiccant is entirely unrestricted as distinguished from the small diameter conduits heretofore known to the art. By this expedient, the structure of the apparatus is tremendously simplified and the control of the sublimation much more readily effected. Furthermore, by the use of a single chamber without pipe lines extending between the desiccant and the biological material, leaks destructive of high vacuums, which were undesirable incidents to the use of prior apparatus, are avoided. By the use of the apparatus of the present invention the desiccant may be regenerated in situ in such a manner that the regenerative step will also produce the complete sterilization of the entire apparatus. With the apparatus of the present invention it is also possible to remove the material from the apparatus after treatment in a manner to prevent contamination thereof by moisture or micro-organisms.

By the use of this process and apparatus, it is possible to treat liquid-containing biologically active materials and the like in large or small quantities and either in treatment or in final storage and/or final shipment containers. It will be understood of course that in the case of serums the final container will be used as an ordinary practice since a minimum of handling is desirable.

The process of the present invention contemplates the freezing of the liquid-containing biological materials either by indirect heat exchange with a cooling material or by degassing followed by subjection to a high vacuum. In either case the materials are maintained in a zone isolated from the atmosphere insofar as pressure and heat exchange are concerned. The frozen material is dehydrated by subliming the ice contained therein while concomitantly absorbing the vapor in a chemical desiccant, which desiccant is so positioned with respect to the material undergoing treatment as to permit of heat exchange between the desiccant and the material. By this expedient, heat control is effected both automatically and with a high degree of efficiency. As the vapor is withdrawn from the material undergoing treatment, it is absorbed by the desiccant. It is well known that absorptions are generally exothermic in character, while sublimation is endothermic. Consequently, heat is required at the point where sublimation is taking place while heat is supplied to meet that requirement at the point of absorption. Since the absorption cannot occur except as the vapor is supplied to be absorbed, it will be seen that an automatic heat supply is provided. Conversely, the desiccant will be kept cool because of the fact that the heat incident to the absorption is radiated through the high vacuum to the sublimation reaction but at a rate automatically maintained at a point not high enough to permit thawing yet sufficiently high to produce as rapid a sublimation as is possible when the escaping vapors are unrestricted in their movement. Because of the fact that the desiccant is kept cool and consequently its aqueous tension is maintained at a low point, very efficient desiccation results.

While the process outlined above is wholly automatic and very satisfactory as long as the desiccant employed is at high absorptive efficiency, after portions of the desiccant have become saturated it has been found desirable to provide a heat source to augment the heat of absorption. This supplemental heat source is so controlled that it is brought into play only when the heat of absorption in those portions of the desiccant body directly responsible for the delivery of heat to the material being treated falls below that required for efficient operation. Such a heat source will permit the use of all portions of the desiccant until saturation of the total body is approached while temperature control derived from the desiccant is maintained. By the provision of this means to augment the heat supply it is possible to employ the desiccant for a longer period of time before regeneration is necessary.

The advantages of the present process may be more fully appreciated from a consideration of the following specific example wherein 4100 mil. of human blood serum and milk were simultaneously treated in a heat insulated reaction zone. 900 pounds of calcium sulfate were placed in heat exchange relationship with the material to be treated. Thereafter the reaction zone was degassed for a period of 90 minutes under low vacuum, approximately 10 mm. mercury absolute. At the end of the degassing period the temperature of the calcium sulfate had risen from an initial temperature of 37° C. to 57° C. The material was then frozen by subjecting it to high vacuum of .160 to .400 mm. of mercury absolute and this vacuum was maintained for a period of 47 hours. During the degassing period the highest temperature reached by the desiccant was 57° C. which was 80 minutes after the process had been started. 75 minutes later, however, the temperature had been lowered to 31° C. and even at the end of the 47-hour treatment the desiccant temperature was only 33° C.

Following subjection of the material to this treatment for 47 hours, two 10-milliliter samples of the desiccated human serum removed from the treating zone were each found, upon examination, to contain less than .050 percent water by weight. The appearance of the final product was characterized by the absence of the thick skin which had been an undesirable characteristic of material treated according to the previously known processes.

Serum of guinea pigs dehydrated according to the present invention having a water content of .050 percent or less may be uniformly maintained with unaltered complementary activity under ordinary refrigeration conditions (5° to 8° C.) for three years and longer, while previously known products having a water content of about .5 percent or more by weight can be uniformly kept under the same conditions without loss of complementary activity not longer than thirteen months.

In the case of citrus fruit juices, it is generally advisable to dehydrate in a vessel other than that in which the final product is to be marketed. But the tendency of the dried material to absorb water renders it necessary to practice a special technique with these materials. It has been determined that the oils and other substances obtained by dehydration of citrus fruit juices, such as orange juice, are exceedingly hygroscopic and that the presence of relatively small amounts of water gives the material a melting point in the neighborhood of normal room temperature. Fusion of the particulate product, which is readily soluble in water, gives a solid compact cake dissolving in water only with great difficulty. However, when orange juice is dehydrated to an extremely low moisture content, the oil in the separate particles does not soften sufficiently to cause the particles to stick together.

Citrus products cannot be dried in their final containers on a practicable scale and therefore transferring of bulk-dried material to the final individual market containers is necessary, such transferring needing to be done with the complete exclusion of moisture. Furthermore, the market containers themselves, prior to filling, must be treated to remove the minute amounts of moisture which normally are present on the surface of any material which has been exposed to the atmosphere, and in the seams of containers, such as tin cans. The said moisture may be removed by heating, by desiccation, or in any other suitable manner.

Complete exclusion of moisture from the packaged product requires that even momentary contact with the atmosphere be avoided, five seconds being sufficient to permit the absorption and retention of sufficient water to cause fusion of the particles because of the extremely hygroscopic nature of the juice when dried to a very low moisture content. The product is normally intended to be stored for days and weeks at room temperature and deterioration due to the particles becoming sticky and forming solid cakes is certain to follow disregard of the above considerations.

Consequently, transference of the dry product must be either through vacuum or dried air or gas to the dry cans. Actually this may be accomplished readily enough by breaking the vacuum within the Cryochem apparatus with dry air or inert gas in the usual fashion. The pans in which the juice is placed for desiccation are fitted with lids which can be snapped closed within the chamber and then these can be carried to and placed within the can filling and sealing equipment. The latter equipment is readily enough arranged for complete exclusion of moisture.

While perfection in transferring the dried juice is practically impossible to attain, it has been found that juices dried to a moisture content of 0.05% and which do not have a final moisture content substantially in excess of 0.15% as packaged may be obtained in the above manner. These retain the desirable properties of a particulate product over very long periods of time.

Other objects and advantages of the present invention will be apparent from a consideration of the following detailed description when taken in conjunction with the annexed drawings wherein:

Figure 1 is a plan view of one embodiment of an apparatus constructed according to the present invention;

Figure 3 is a view in section taken along the line 3—3 of Figure 2;

Figure 4 is a fragmentary view in section taken along the line 4—4 of Figure 2;

Figure 5 is a vertical sectional view taken along the line 5—5 of Figure 1;

Figure 6 is a fragmentary partially in section view of a sterility rack for supporting containers in the treatment zone;

Figure 7 is a fragmentary view in elevation of a sterility rack showing several containers depending therefrom; and Figure 8 is a detail view of the auxiliary means for effecting a seal between the reaction vessel and the cover therefor.

Figure 2:
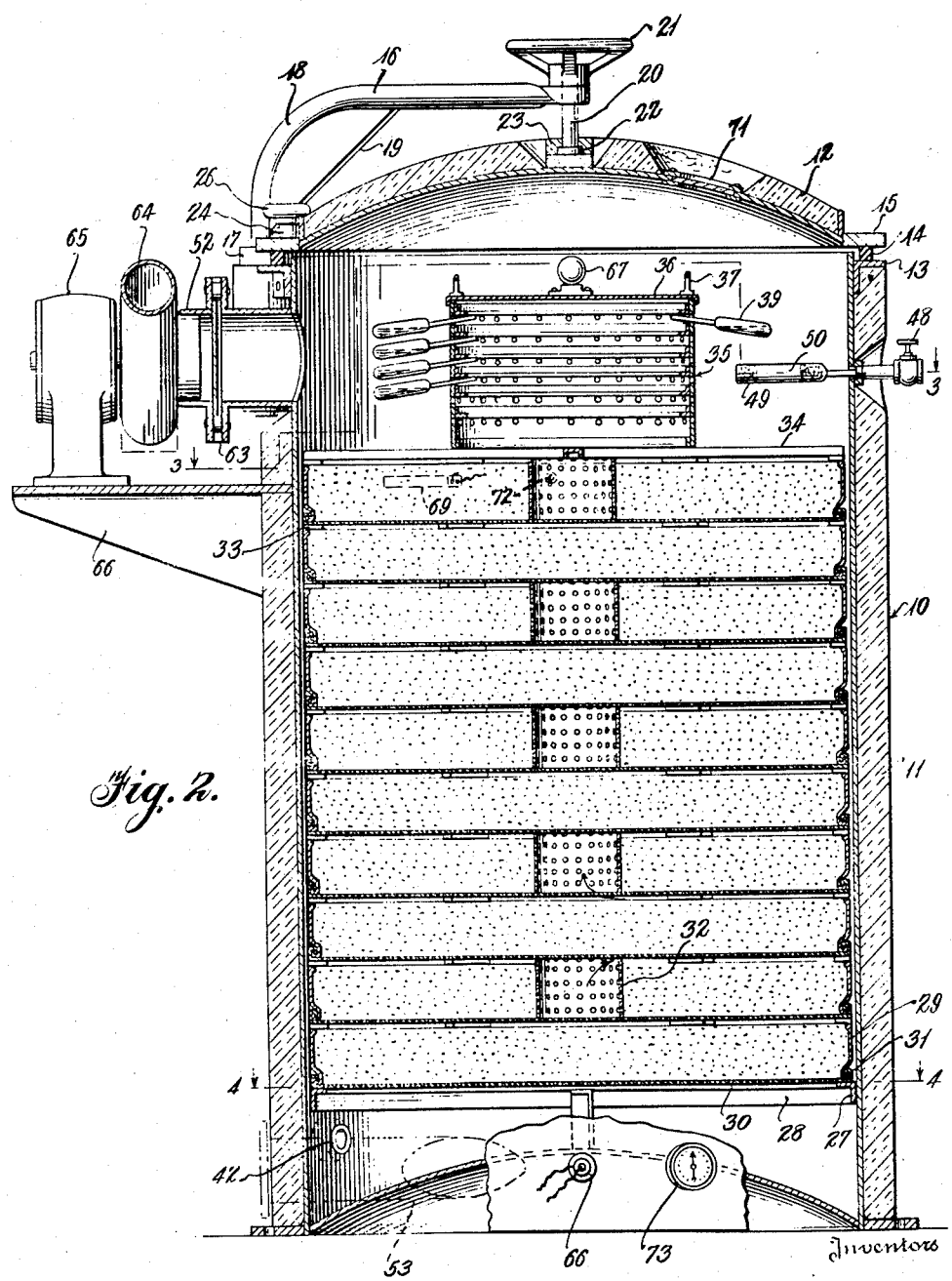
Figure 2 is a vertical sectional view taken along the line 2—2 of Figure 1.

Referring in detail to the drawings, 10 designates a vacuum chamber in which the process of the present invention may be advantageously carried out. This chamber is reinforced against pressure incident to the withdrawal of air therefrom and is provided with a heat insulating sheath 11. Chamber 10 is also provided with a cover 12 which may be locked vapor-tight.

Around the open end of container 10 there is attached a ring 13, L-shaped in cross section, and functioning as a seat for annular rubber sealing gasket 14 which is interposed between the same and cooperating annular flange 15 provided on cover 12. Cover 12 is supported by an arm 16, one end of which is pivotally attached at 17 to the outside wall of container 10. Arm 16 is bent at 18 so that the free end thereof may be swung into a position to overlie the vertical axis of container 10. At the point of bend a reinforcing element 19 is provided for the purpose of imparting rigidity to arm 16 so that it may support cover 12. The free end of arm 16 is drilled and a screw 20 is passed therethrough, said screw being provided with an interiorly threaded handle 21 and an enlarged end 22 which is keyed in socket 23 in the center of cover 12. When cover 12 is to be placed in sealing position to act as a closure for the open end of container 10, it is swung about its pivot point 17 until flange 15 of the cover overlies gasket 14. When this position has been reached, handle 21 is turned to increase the effective length of screw 20 between the end of arm 16 and socket 23. This operation will press flange 15 of cover 12 tightly against gasket 14 to assist in maintaining a vacuum tight seal. When it is desired to remove the cover, handle 21 is moved in the opposite direction thus shortening the said effective length of screw 20 to permit the movement of arm 16 and cover 12 about the axis 17. In view of the fact that materials to be treated in container 10 are subjected to high vacuum, auxiliary means for compressing gasket 14 are provided. The means consist of a series of threaded studs 24, shown in detail in Figure 8, pivotally attached to member 13 and adapted to be swung into position in notches 25 provided in flange 15 and in ring 13. In this position interiorly threaded nuts 26 may be screwed thereon to a point where said nuts press tightly against flange 15 of cover 12 thus acting to further compress gasket 14.

Near the base of and within container 10 there is attached to the wall thereof an annular member 27 and two chord-like channel bars 28 supported from the bottom of chamber 10 which act as a support for a series of desiccant trays 29. Each of these desiccant trays is provided with a perforated bottom 30 and solid side walls 31. Alternate trays 29 are provided with centrally disposed cylindrical chimneys 32 which are made of the same material as the bottoms 30. At spaced points about the upper rim of each tray 29 are projections 33 which act as supports for the next tray above. The apparatus shown contains ten trays and overlying the topmost tray is a cross-shaped spider 34 made of channel bars and positioned so as to rest on projections 33. Centrally disposed on the spider 34 there is a cylindrical rack 35 having a removable cover 36 provided with handles 37. The side walls of the rack 35 are perforated as shown in Figures 6 and 7, the perforations being in staggered rows between each of which an interior annular angle iron 38 is positioned to act as a stop for the free end of containers 39 placed therein. Note that the annular angle irons are vertically adjustable by alteration of the position of screw 40 so that the angle defined by the container and the cylindrical wall of rack 35 may be varied to avoid spilling of the contents of the container. This is accomplished by moving screws 40 vertically in slots 41 provided in cylindrical wall 35.

In the side wall of the chamber 10, below the point where the desiccant trays are placed, there is provided an exhaust pipe 42 provided with a valve 43. The pipe 42 is connected to a suitable pump not shown and constitutes the line through which evacuation of the chamber is effected. A connection 44 is provided in the upper portion of the chamber 10. This line is provided with a valve 45 which is vapor-tight when either open or closed. A container 46, similar to containers 39, is attached to line 44 so that the reaction therein may be observed by the operator, especially when the air is first evacuated from the chamber 10 as the process is begun. Adjacent connection 44 there is provided a pipe connection 47 leading to the outside atmosphere and subject to being placed in communication therewith by valve 48. When it is desired to relieve the vacuum existing within chamber 10, the valve 48 may be opened so that air may pass through the pipe line 47. Within the line there is provided a filter 49 of cotton or other suitable material and a desiccant 50. It will be seen as air or other gas is admitted to the chamber it will be filtered and dehydrated in passage.

Mounted adjacent primary chamber 10 there is an auxiliary chamber 51 connected to the former through air ducts 52 and 53. Chamber 51 consists of a hood 54, side walls 55 and a bottom or base portion 56 defining an interior chamber. Surrounding the primary side walls 55 and spaced therefrom are additional walls 57 serving to define a space completely surrounding the interior chamber. Connections for a fluid duct, not shown, are provided at 58. Binding posts 59 suitably shielded in box 60 are attached to and insulated from an upper portion of side wall 55 of the interior chamber. Also attached to this wall are a series of transverse supports 61 having resistance elements 58 depending therefrom. Current is supplied to the resistance elements through binding posts 59 and supports 61 from lead-in wires 58.

Intermediate chambers 51 and 10 are slide valves 63 which may be closed vacuum-tight to isolate chamber 51 from chamber 10 or opened to place the two chambers in communication. In order to effect a circulation of air between said two chambers, a fan 64 is provided, driven from a motor 65 in a direction such that air is forced downwardly through the chamber 51. The fan motor assembly is supported on a bracket 66 extending from the side wall of chamber 10.

When air is circulated through ducts 52 and 53, and consequently through chambers 10 and 51, heat is imparted to the air, for regeneration of the desiccant and sterilization of the apparatus, by closing the circuit including lead-in wires 58. In order to effect automatic temperature control during this heating operation, a thermostat 66 is mounted near the bottom of chamber 10 and is connected by suitable electric conduits to act as a secondary circuit breaker as regards the circuit supplying current to resistance elements 58.

While it will be recognized that during the conduct of the desiccative stage of the process of the present invention in the apparatus now under consideration, temperature control will be effected automatically by the absorption of water in the desiccant placed in trays 29. In the event an auxiliary heat source is needed, such heat may be supplied automatically from an electric light bulb 67 attached to the top 36 of supporting rack 35. This bulb is supplied through suitable conduits passing through the side wall of chamber 10. The circuit may be closed by primary circuit breaker 68 or through the action of thermostat 69 which is placed in the top desiccant tray. In this way the automatic supply of auxiliary heat is closely co-ordinated with the automatic supply from the heat of reaction of water vapor with the desiccant. By proper setting of thermostat 69, say at 20° C., the auxiliary supply is unavailable as long as the heat of reaction maintains at least this temperature in the desiccant. An additional use of light 67 is for observing the condition of material in containers 39 during various stages of the process. This observation is effected by momentarily closing the circuit supplying bulb 67 by operating push-button 70 while looking through sight glass 71 which is mounted in the top 12 of the chamber 10.

The temperature of the desiccant at all times is rendered observable by the provision of thermometer 72 mounted in the top desiccant tray. At the base of chamber 10 another thermometer 73 is mounted for rendering observable the temperature of air passing through the duct 53, from resistance elements 62 in chamber 51, during regeneration and sterilization.

When the process is carried out according to the present invention, employing the apparatus just described, it is necessary to place a desiccant within the trays 29 in the position shown in the drawings. Desiccant 50 is also placed in the pipe line 47 as well as the filtering material 49. Thereafter, the spider 34 carrying the sterility rack 35 is placed in position. At this point it may be necessary to effect the sterilization of the container itself as well as the air therein or to regenerate the desiccant. In order to effect this step, valves 63 are opened and the circuit supplying resistance elements 62 is closed, the thermostat 66 being set to a suitable temperature, approximately 375° F., when calcium sulfate is used as the desiccant. The fan 64 is then started and will effect the circulation of air through the heat exchanger and the chamber 10 in the direction of the arrows in Figure 2. This temperature is maintained until the entire apparatus has reached at least 300° F. in order to effect complete sterility. Thereafter, the circuit supplying resistance element 62 is opened and the fan 64 is permitted to continue to run while a cooling material is circulated through lead-ins 56 and around wall 55 to cool the sterile air being circulated in the chamber. When the sterile air and container have been sufficiently cooled so as to lower the aqueous tension of the desiccant, fan 64 is shut off and valves 63 are closed vacuum-tight. At this point, a series of glass containers 39 having ends of reduced diameter are placed within the sterility rack 35 with their open ends in communication with the interior thereof. Cover 12 is then fastened vacuum-tight and the air is slowly evacuated from the chamber through pipe line 42. The valve 43 is opened and regulated in order to control the degree of vacuum. For the first 15 to 20 minutes of operation, the operator regulates this valve so that the gases in the material in the observable container at 46 are not released too rapidly and will not cause the material to splash out through the neck. If conditions in container 46 are satisfactory, the operator will know that similar conditions obtain in containers 39. Furthermore, use may be made of the sight glass 71 placed in the cover 12 of the chamber to enable the operator to see the condition of the material being processed inside. When all the gases are thus released, the valve 43 is opened fully and the gradual increase in vacuum and the consequent evaporation and cooling effect causes the material in the containers to freeze. Thereafter, a high vacuum is placed on line 42. This high vacuum will effect the sublimation of the ice formed by the freezing of the material in containers 39, the sublimated vapor being absorbed by an exothermic reaction with the chemical desiccant. The heat of this exothermic reaction will be transmitted to containers 39 whereby to supply the latent heat of sublimation. The vacuum is maintained for 6 to 24 hours or longer depending upon the amount of the individual volumes in the containers at the end of which time the material in containers 39 will be dehydrated to an extent approaching .050 percent water content or less. At this point the valve 43 is closed and valve 48 is opened admitting dry sterile air to the chamber. Cover 12 may be opened and the containers withdrawn one by one to be sealed in any known manner.

Because of the fact that the air, or other gas such as nitrogen or argon, used to break the vacuum in container 10, is filtered and dehydrated while passing through line 47, the interior of rack 35 will be filled with dry sterile air or gas. Consequently, when containers 39 are removed from the rack they will contain only sterile air or gas and the material treated. The thin neck may be heated and drawn out to a point to seal the container while a plug of cotton or similar material may be placed in the aperture in rack 35 from which the container was withdrawn. This expedient prevents the ingress of non-sterile air to the interior of rack 35. In lieu of containers 39 it is possible to use bottles, the mouth of which may be plugged in one or more known ways. Asepsis within the container 35 is maintained in the same manner.

It has been found that four or more dehydration runs of the type just described may be conducted before it is necessary to regenerate the desiccant contained in trays 29. When regeneration is to be effected, cover 12 is lowered and fastened. Valves 43, 45 and 48 are closed and valves 63 are opened. The circuit supplying resistance element 62 is closed and fan 64 is placed in operation. The hot air at the proper temperature is passed as in the original sterilization step and in addition to sterilizing, effects the regeneration of the desiccant by the removal of water therefrom. After regeneration, cover 12 is raised above gasket 14 so that the warm air of high moisture content is removed from chamber 10. The cover is then closed and the air is cooled as in the original sterilization step. It will be noted that the operation just described will effect the sterilization of all of the removable elements in chamber 10 which include the supports 29, the sterility rack 35 and the various controlling devices. Desiccant 50 will be regenerated at the same time that the primary desiccant is restored.

It will be apparent that any heat exchanger may be substituted in the chamber 51 and it is proposed to pass hot flue gases through a bank of tubes in order to effect the necessary heating of the air. Water or other fluid jackets may be substituted in the cooling step.

In the event it is desired to effect the freezing of the biologically active materials directly by heat exchange from a cooling medium, refrigeration coils may be mounted at the top of the chamber 10 to overlie rack 35. In such event, the materials are frozen either before or after placing the containers in the chamber 10. In the former case, the refrigeration coils serve merely to prevent thawing of the prefrozen materials during evacuation of the apparatus to the point where the cooling effect of rapid evaporation will maintain the frozen state. Sublimation, of course, will be effected as before.

In the specification and claims hereof the term "sublimation" is used to define the change of a solid to a gas without intermediate passage through a liquid stage irrespective of whether or not the vapor so formed is, thereafter, condensed.

While the desiccant used in the process herein described is specified to be calcium sulfate, any porous, non-deliquescent, solid, heat regenerable desiccant may be used.

We claim:

1. A process of treating with a chemical desiccant to improve the keeping qualities of liquid-containing materials in a zone isolated from the atmosphere and regenerating the desiccant in situ which comprises, placing the materials in the zone, isolating the zone from the atmosphere, degassing the materials by subjecting the zone to a moderate vacuum, thereafter subjecting the materials in the zone to a high vacuum to effect the freezing thereof, subliming the ice so formed while concomitantly absorbing the vapor formed from the ice in a chemical desiccant and subjecting the material to the radiant heat of said desiccant to provide latent heat of sublimation, continuing said sublimation and absorption until the desired amount of water has been removed, thereafter removing said materials from said zone, repeating this entire operation until the desiccant is no longer effective, and thereafter passing heated air through said zone to regenerate said desiccant while concurrently sterilizing said air and the apparatus.

2. A process of treating with a chemical desiccant to improve the keeping qualities of liquid-containing materials in a zone isolated from the atmosphere and regenerating the desiccant in situ which comprises, placing the materials in the zone, isolating the zone from the atmosphere, degassing the materials by subjecting the zone to a moderate vacuum, thereafter subjecting the materials in the zone to a high vacuum to effect the freezing thereof, subliming the ice so formed while concomitantly absorbing the vapor formed from the ice in a chemical desiccant and subjecting the materials to the radiant heat of said desiccant to provide latent heat of sublimation, continuing said sublimation and absorption until the desired amount of water has been removed from said zone, repeating this entire operation until the desiccant is no longer effective and passing heated air through said zone to regenerate said desiccant while concurrently sterilizing said zone, and continuing the circulation of said air after the regeneration is complete in indirect heat exchange relationship with a cooling fluid, whereby to lower the temperature within said chamber while maintaining asepsis.

3. An apparatus for the treatment of liquid-containing biological substances to improve their keeping qualities which comprises, a chamber, a rack adapted to support open end containers for material to be treated, said rack dividing said chamber into two compartments, one of said compartments being provided with means for effecting the removal of said containers to the outside atmosphere, containers in said rack having their closed ends within said compartment having means for effecting removal of containers, and the open ends in the other compartment, whereby following treatment the containers may be removed from the rack while the open ends of the remaining containers are substantially protected from the atmosphere.

4. A process of treating with a chemical desiccant to improve the keeping qualities of liquid-containing materials in a zone isolated from the atmosphere and regenerating the desiccant in situ which comprises, placing the materials in the zone, freezing the same, isolating the zone from the atmosphere, thereafter subjecting the materials in the zone to a high vacuum to sublime the ice while concurrently removing the vapor formed from the ice in a chemical desiccant, subjecting the materials to the radiant heat of said desiccant to provide latent heat of sublimation, continuing said sublimation and absorption until the desired amount of water has been removed from the materials, thereafter removing the materials from said zone, repeating this entire operation until the desiccant is no longer effective, and thereafter passing heated air through said zone to sterilize and regenerate said desiccant, continuing the circulation of said air after the regeneration is complete in indirect heat exchange relationship with a cooling fluid, whereby to lower the temperature within said chamber while maintaining asepsis.

5. A process of treating liquid-containing biological materials and the like in a heat insulated zone whereby to improve their keeping qualities which comprises, freezing the material, subliming the ice formed, concomitantly absorbing the vapor formed from the ice in a chemical desiccant, subjecting the materials to the radiant heat from said desiccant and from an auxiliary source of radiant heat controlled by the temperature of said desiccant, maintaining the temperature at the point of sublimation sufficiently high so that sublimation and absorption may continue at high efficiency after the radiating surface of the desiccant has become cooled below the point of maximum efficiency.

6. A process of treating with a chemical desiccant to improve the keeping qualities of liquid-containing materials in a zone isolated from the atmosphere and regenerating the desiccant in situ, which comprises, placing the materials in a zone, isolating the zone from the atmosphere, degassing the materials by subjecting the zone to a moderate vacuum, thereafter subjecting the materials in the zone to a high vacuum to effect the freezing thereof, subliming the ice so formed, while concomitantly absorbing the vapors formed from the ice in a chemical desiccant, continuing said sublimation and absorption until the desired amount of water has been removed, thereafter removing said materials from said zone, repeating this entire operation until the desiccant is no longer effective, and thereafter passing heated air through the zone to regenerate said desiccant, while concurrently sterilizing said air and the apparatus.

7. A process of treating with a chemical desiccant to improve the keeping qualities of liquid-containing materials in a zone isolated from the atmosphere and regenerating the desiccant in situ which comprises, placing the materials in the zone, freezing the same, isolating the zone from the atmosphere, thereafter subjecting the materials in the zone to a high vacuum to sublime the ice while concurrently absorbing the vapor formed from the ice in a chemical desiccant, continuing the said sublimation and absorption until the desired amount of water has been removed from the materials, and removing the materials from said zone, repeating this entire operation until the desiccant is no longer effective, and thereafter passing heated air through said zone to sterilize and regenerate the desiccant, continuing the circulation of said air after regeneration is complete in indirect heat exchange relationship with a cooling fluid, whereby to lower the temperature within said chamber while maintaining asepsis.

EARL W. FLOSDORF.
FRANCIS JOSEPH STOKES, Jr.